(12) United States Patent
Oda et al.

(10) Patent No.: US 6,650,833 B1
(45) Date of Patent: Nov. 18, 2003

(54) EXPOSURE CONTROL DRIVE APPARATUS

(75) Inventors: Hajime Oda, Narashino (JP); Yoichi Seki, Narashino (JP)

(73) Assignee: Seiko Precision Inc., Chiba-ken (JP)

( * ) Notice: Subject to any disclaimer, the term of this patent is extended or adjusted under 35 U.S.C. 154(b) by 182 days.

(21) Appl. No.: 09/684,292

(22) Filed: Oct. 6, 2000

(30) Foreign Application Priority Data

Oct. 8, 1999 (JP) ............................................. 11-287716

(51) Int. Cl.[7] .............................. G03B 13/18; G03B 7/26
(52) U.S. Cl. .......................... 396/89; 396/129; 396/205; 396/303
(58) Field of Search .......................... 396/89, 129, 202, 396/203, 205, 206, 219, 221, 278, 279, 303

(56) References Cited

U.S. PATENT DOCUMENTS 5,365,305 A * 11/1994 Seki et al. .................. 396/279
5,678,077 A * 10/1997 Ichikawa et al. ............ 396/205
5,832,324 A * 11/1998 Shimizu et al. ............. 396/303
5,898,460 A * 4/1999 Koyama ...................... 348/296

* cited by examiner

*Primary Examiner*—Russell Adams
*Assistant Examiner*—Arthur A Smith
(74) *Attorney, Agent, or Firm*—Adams & Wilks

(57) ABSTRACT

To prevent temporary reduction of battery voltage when driving a shutter, an exposure control drive apparatus is provided with a boosting circuit for boosting a voltage of the battery and outputting a boosted voltage. A capacitor is charged by the boosted voltage for driving an actuator of an exposure control mechanism. A detecting circuit detects a current flowing in the boosting circuit and a control circuit controls operation of the boosting circuit in accordance with a magnitude of the detected value so that the boosting circuit is prevented from boosting the battery voltage when the detected current exceeds a predetermined level and is permitted to boost the battery voltage when the detected current is below the predetermined level. In this manner, the current flowing from the battery is prevented from exceeding a maximum level.

15 Claims, 12 Drawing Sheets

EXPOSURE CONTROL DRIVE APPARATUS

BACKGROUND OF THE INVENTION

The present invention relates to an exposure control drive apparatus.

Conventionally, an actuator such as a motor or the like for driving a member for controlling an exposure device such as a shutter or a diaphragm is driven by using a battery power source via a regulator as shown by FIG. 14.

FIG. 14 shows an example of a conventional digital still camera. In the drawing, a regulator REG1 stably supplies a regulated output voltage of a battery E to a control circuit (hereinafter, referred to as "CPU") 100, a light measuring circuit (hereinafter, referred to as "AE") 2, a distance measuring circuit (hereinafter, referred to as "AF") 3, a photographing unit (hereinafter, referred to as "CCD") 4 including CCD(s) as photographing elements, a CCD drive circuit (hereinafter, referred to as "CCDDR"), an image signal processing circuit and a drive voltage generating circuit and an electronic viewfinder (hereinafter, referred to as "EVF") 5 including a liquid crystal panel for displaying a photograph captured by the CCD 4, a liquid crystal panel drive circuit and a drive voltage generating circuit.

The CPU 100 comprises a CPU, ROM and RAM and controls various operations in accordance with operation programs stored in ROM. A stroboscopic device 6 comprises a booster circuit and a stroboscopic light emitting unit and is controlled by the CPU 100.

A motor driver DRV 200 comprises transistors Tr11 through Tr14 and diodes D11 through D14 for supplying current to a coil La of a motor 9 for driving members for exposure control such as the shutter or the diaphragm. Current supplied to the coil La is supplied from the battery E via a regulator REG300.

A voltage detecting circuit VDT0 detects the voltage of the battery E and generates an output for detecting battery rundown when the voltage of the battery E becomes proximate to a minimum voltage guaranteeing proper operation of the CPU 100. The CPU 100 generates a low battery alarm at a display unit (not illustrated) in accordance with the battery rundown detected output and prevents the shutter from being released by making a release switch (not illustrated) inoperable.

Generally, when power source voltage is lowered, a control circuit such as the CPU 100 undergoes erroneous operation or becomes inoperable and when a battery is used as a power source, the larger the consumed current, the lower the battery voltage becomes due to the internal resistance of the battery.

According to the example of FIG. 14, in order to avoid operational failure of the CPU 100 due to lowering of the battery voltage, the voltage of the battery E is monitored by the voltage detecting circuit VDT0 and when the battery voltage becomes proximate to the minimum voltage guaranteeing proper operation of the CPU 100, a battery low alarm is displayed and the shutter is prevented from being released. That is, the "battery rundown" is determined at a time point at which the battery voltage becomes proximate to the minimum voltage guaranteeing proper operation of the CPU 100.

According to the above construction having the battery voltage monitoring function, there is a case in which by virtue of the consumed current flowing in a circuit which is temporarily operated, that is, by virtue of a temporary increase in the consumed current, the battery voltage decreases to proximate the minimum voltage guaranteeing proper operation of the CPU 100 and battery rundown is determined although there still is an allowance actually in the capacity of the battery.

Particularly, in the case of a digital still camera, there are many cases where an electronic viewfinder comprising a photographing unit having CCDs or a liquid crystal panel is used, where the battery is used as the power source for such a viewfinder. There is a case in which such a viewfinder is operated in photographing, particularly in determining composition. When the shutter is driven under this state, the consumed current is temporarily increased and accordingly., there is a significant possibility of producing the above-described erroneous determination.

Recently, in order to avoid the above-described drawback in a digital still camera, it has been devised that for example, in charging a stroboscope device, simultaneous drive of a plurality of circuits is avoided as much as possible such that operation of the liquid crystal panel of the electronic view finder is stopped to thereby lower a peak current value of the battery E.

However, even when various circuits are prevented from being driven simultaneously as much as possible, there are still present circuits which must be driven simultaneously in view of the mechanism and in that case, the peak current of the battery E is naturally increased and there is a problem of determining "battery rundown" even with a battery in which only a short time period has elapsed from the start of use.

SUMMARY OF THE INVENTION

The present invention has been devised to overcome the forgoing drawbacks. According to an aspect of the invention, there is provided an exposure control drive apparatus comprising a booster circuit for boosting voltage of a battery, a capacitor charged via the booster circuit, an actuator for driving an exposure control member with the capacitor as a power source, a detecting circuit for detecting a value in accordance with a current flowing in the booster circuit, and a control circuit for controlling operation of the booster circuit in accordance with a magnitude of the detected value. Therefore, a magnitude of current flowing from the battery can be controlled. Therefore, for example, a peak value of the current flowing from the battery can be restricted and temporary voltage drop of the battery can be restrained.

When the control circuit controls the operation of the booster circuit such that the detected value does not exceed a predetermined value, for example, the peak value of the current flowing from the battery can be restricted and temporary voltage drop of the battery can be restrained.

It is preferable that the booster circuit includes a booster coil and a switching transistor and outputs a boosted voltage by a switching operation of the switching transistor, and the control circuit controls the switching operation of the switching transistor in accordance with the magnitude of the detected value.

When the control circuit controls a pulse width of a switching pulse specifying the switching operation of the switching transistor in accordance with the magnitude of the detected value, individual pulse widths can be switched and accordingly, a value of the current flowing from the battery can be finely controlled.

The booster circuit may include a resistor in which the on current of the switching transistor flows, and the detecting circuit may detect voltage generated by flowing the on current in the resistor.

When the booster circuit includes a resistor in which on current of the switching transistor flows, and the detecting circuit detects a sum of voltages generated by flowing the on current in the resistor and the saturated voltage of the switching transistor generated when the switching transistor flows the on current, the saturated voltage of the switching transistor can be used as a bias voltage and accordingly, the detection level can be shifted.

There may also be constructed a circuit in which the booster circuit includes a booster coil and a switching transistor and outputs a boosted voltage by a switching operation of the switching transistor, a collector of the switching transistor is connected to one end of the capacitor via a diode, an emitter of the switching transistor is connected to the other end of the capacitor and the detecting circuit detects voltage generated in a resistor provided between the emitter of the switching transistor and a low potential side of the battery. In this case, the detected voltage is increased or reduced retardedly from on or off of the switching transistor by influence of the capacitor and becomes easy to detect.

It is preferable that the duty cycle of the switching pulse is equal to or larger than 50%.

The booster circuit may be prohibited from executing a boosting operation in driving the actuator and/or at a desired time.

DETAILED DESCRIPTION OF THE PREFERRED EMBODIMENTS

A specific explanation will be given of the invention based on an embodiment with reference to the attached drawings as follows.

Figure 1:
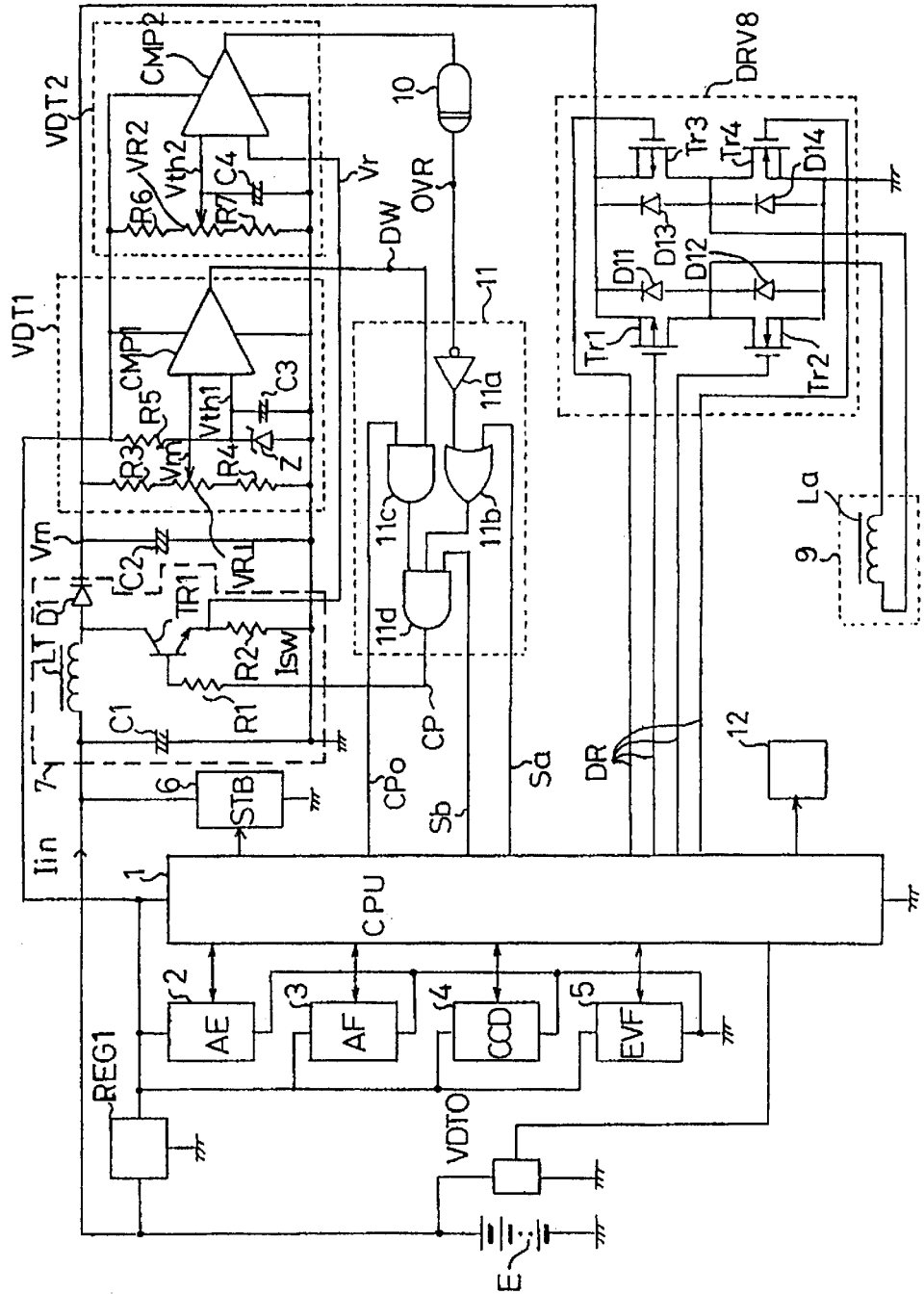
FIG. 1 is a circuit diagram showing an embodiment of the invention.
Figure 14:
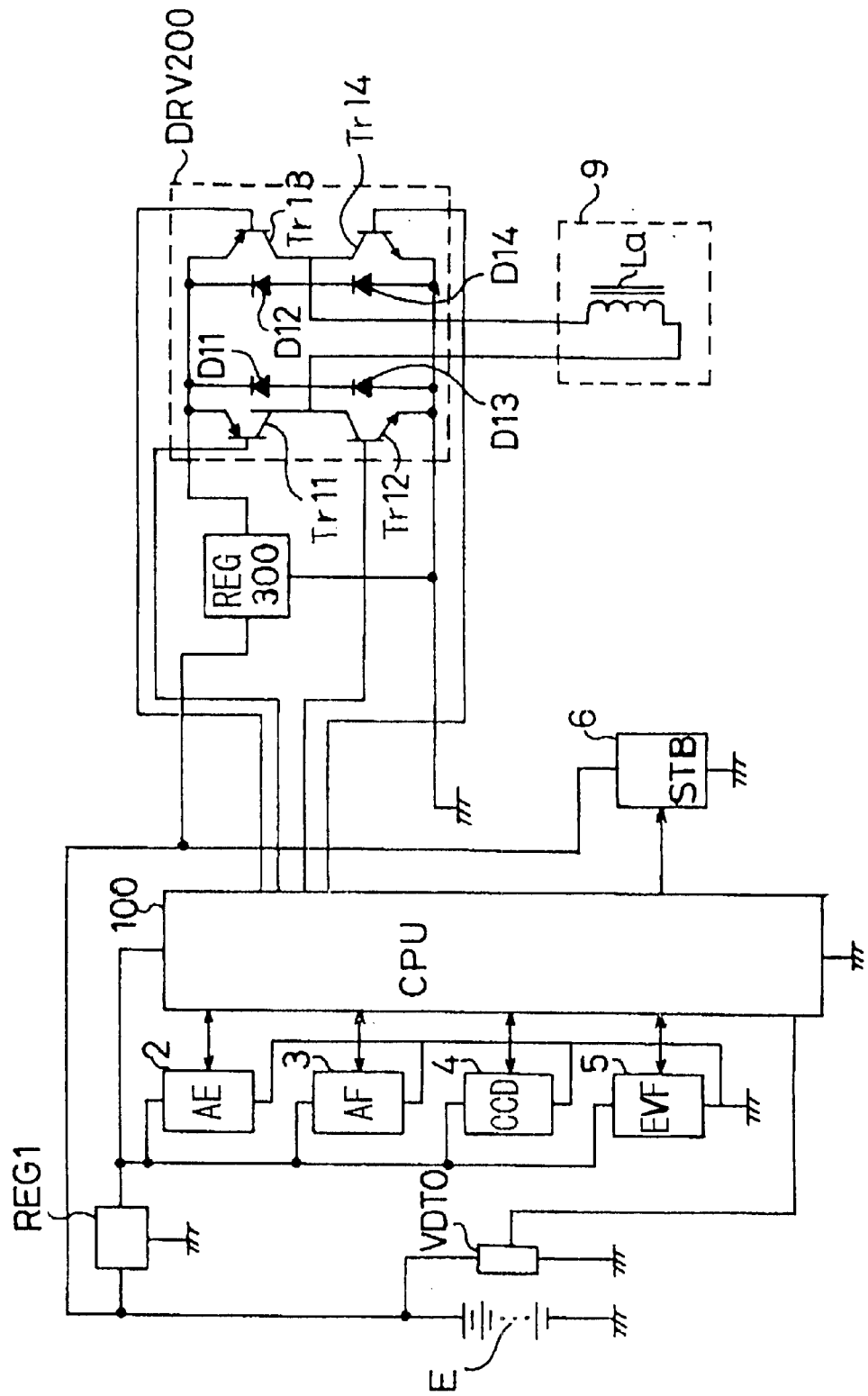
FIG. 14 is a circuit diagram showing a conventional example.

FIG. 1 shows an example of applying the invention to a digital still camera. In the drawing, elements or portions having constitutions the same as those in FIG. 14 are labelled with the same notations.

In the drawing, the control circuit (hereinafter, referred to as "CPU") 1 comprises a CPU, ROM and RAM and controls various operations in accordance with operational programs stored in the ROM.

As an example of an actuator, the motor 9 is adopted in this example, a drive circuit DRV8 comprises transistors Tr1 through Tr4 and diodes D11 through D14, gates (control terminals) of the transistors Tr1 through Tr4 are supplied with operation control signals DR from the CPU 1, and the motor 9 for driving a member A for exposure control, mentioned later, is driven by controlling the coil La of the motor 9. By selectively activating the transistors Tr1 through Tr4 and changing a direction of conducted current of the coil La of the motor 9, forward and reverse magnetic forces are generated. The coil La of the motor 9 is driven with the charge voltage of a capacitor C2 as a power source.

A converter 7 serving as a voltage boosting circuit comprises a capacitor C1, resistors R1 and R2, a switching transistor TR1, a diode D1 and a booster coil L1 for supplying an electromotive force generated in the booster coil L1 in accordance with the ON/OFF state of the switching transistor TR1 to the capacitor C2 via the diode D1 to thereby charge the capacitor C2.

A voltage detecting circuit VDT1 comprises resistors R3, R4 and R5, a variable resistor VR1, a Zener diode Z, a capacitor C3 and a comparator CMP1 having a hysteresis characteristic. The comparator CMP1 compares a voltage Vm' produced by dividing a charge voltage Vm of the capacitor C2 by the resistors R3 and R4 and the variable resistor VR1 with reference voltage Vth1 set by the Zener diode Z and the capacitor C3, outputs an "H" level from a terminal DW when the voltage Vm' is equal to or lower than the reference voltage Vth1 and outputs an "L" level from the terminal DW when the voltage Vm' becomes equal to or higher than voltage Vmax produced by adding a hysteresis voltage ΔVh to the reference voltage Vth1.

A voltage detecting circuit VDT2 comprises resistors R6 and R7, a variable resistor VR2, a capacitor C4 and a comparator CMP2, and compares a voltage Vr generated in the resistor R2 in the converter 7 with reference voltage Vth2 set by the resistors R6 and R7 and the variable resistor VR2 by the comparator CMP2 and outputs an "H" level when the voltage Vr becomes equal to or higher than the reference voltage Vth2. A one-shot pulse generating circuit 10 outputs one pulse having a predetermined pulse width to a terminal 0VR when an "H" level is output from the voltage detecting circuit VDT2. The voltage Vr generated at the resistor R2 is proportional to the magnitude of the ON current of the switching transistor TR1 in the converter 7 and the magnitude of the ON current of the switching transistor TR1 corresponds to current Iin flowing out from the battery E.

A converter control circuit 11 comprises an inverter 11a, gate circuits 11b, 11c and 11d, and inputs an output of the voltage detecting circuit VDT1, the pulse OVR and a reference booster signal cp0, a booster permitting signal Sb and a booster control signal Sa from the CPU 1 and controls the ON/OFF state of the switching transistor TR1 in the converter 7 by an output of the gate circuit 11d. Further, the output of the gate circuit 11d constitutes a switching pulse. When restriction of current consumed from the battery E is not needed, the booster control signal Sa uses the reference booster signal cp0 as a switching pulse cp as it is to thereby shorten a time period required for boosting. For example, when the capacitor C2 is initially charged by turning ON the power source of the digital still camera, the reference booster signal cp0 is used as it is as the switching pulse cp by the booster control signal Sa. A display unit 12 carries out a display of "battery rundown" alarm.

Figure 2:
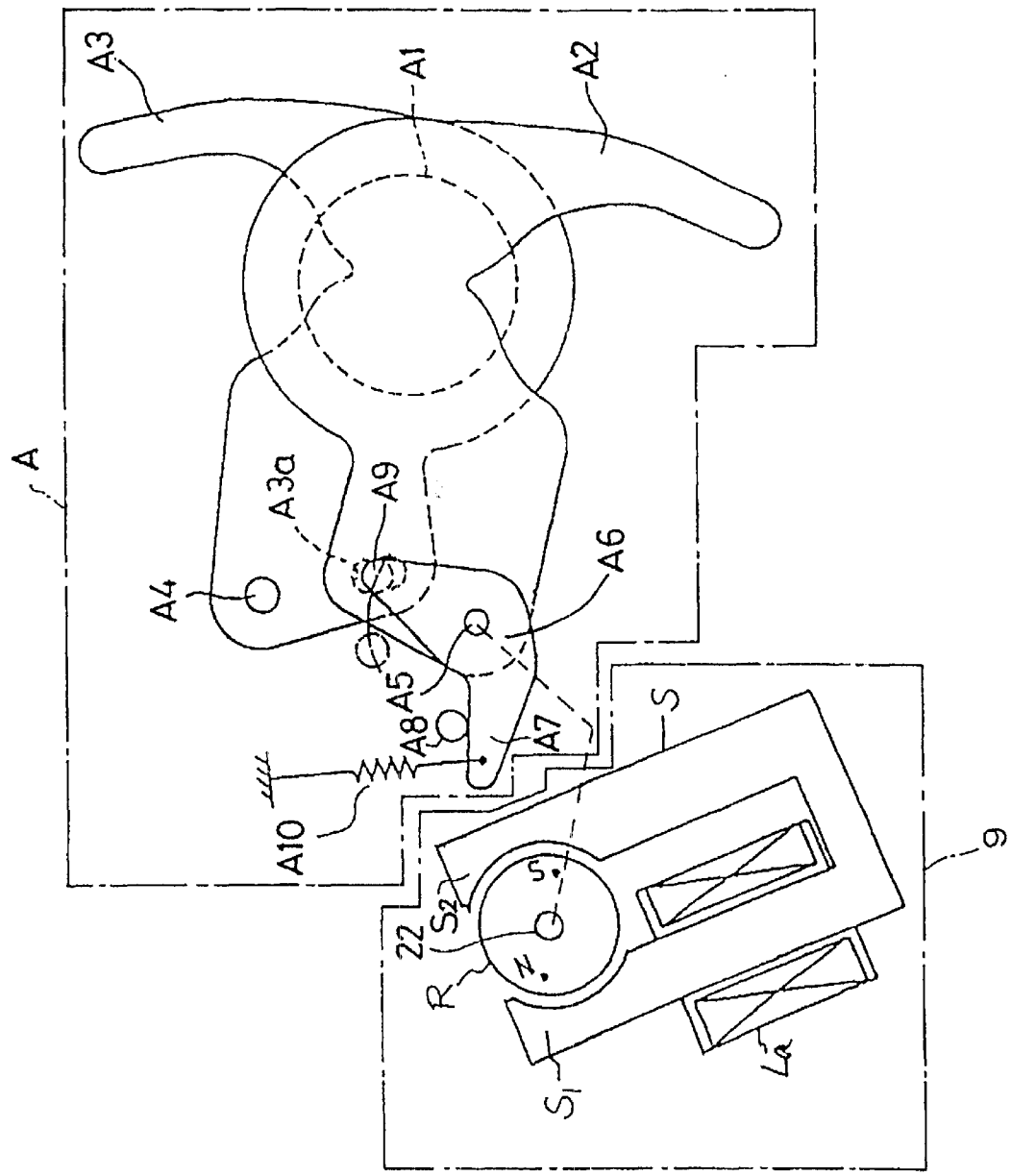
FIG. 2 is a view showing details of essential portions of FIG. 1.

FIG. 2 shows the motor 9 and the member A for exposure control. In this example, there is used a shutter which also serves as a diaphragm as the member A for exposure control. In the drawing, the motor 9 is constituted by a rotor R, a stator S and the coil La. The stator S is provided with pole portions S1 and S2, and an N pole and an S pole are respectively produced by switching a direction of electricity conducted to the coil La in forward and reverse directions. Thereby, the rotor R can be rotated in both forward and reverse directions.

Sectors A2 and A3 for opening and closing a shutter opening A1 by being driven by rotating the motor 9, are symmetrically arranged with respect to the shutter opening A1. The sector A3 is supported pivotably around a shaft A4 projected from a base plate (not illustrated). The sector A2 is supported pivotably around a shaft A5 fixedly press-fitted to the rotor R, and a sector opening and closing lever A6 is pivotably supported around the shaft A5 at an upper face of the sector A2. An arm portion A7 of the sector opening and closing lever A6 is engaged with an engaging pin A8 provided at the base plate, and a sector opening and closing lever pin A9 of the sector opening and closing lever A6 is axially attached to the sector A2 and engaged with a groove portion A3a of the sector A3 to thereby drive the sectors A2 and A3. The sector opening and closing lever A6 is normally urged in the clockwise direction by a spring A10. In this example, when electricity is supplied to the coil La in the forward direction, that is, when the transistors Tr1 and Tr4 are turned ON and the transistors Tr2 and Tr3 are turned OFF, the shutter A which also serves as a diaphragm is opened to thereby open the shutter opening A1, photographing light reaches CCDs in the CCD 4 and when electricity is supplied to the coil La in the reverse direction, that is, when the transistors Tr2 and Tr3 are turned ON and the transistors Tr1 and Tr4 are turned OFF, the shutter A which also serves as a diaphragm is closed to thereby close the shutter opening A1.

Figure 3:
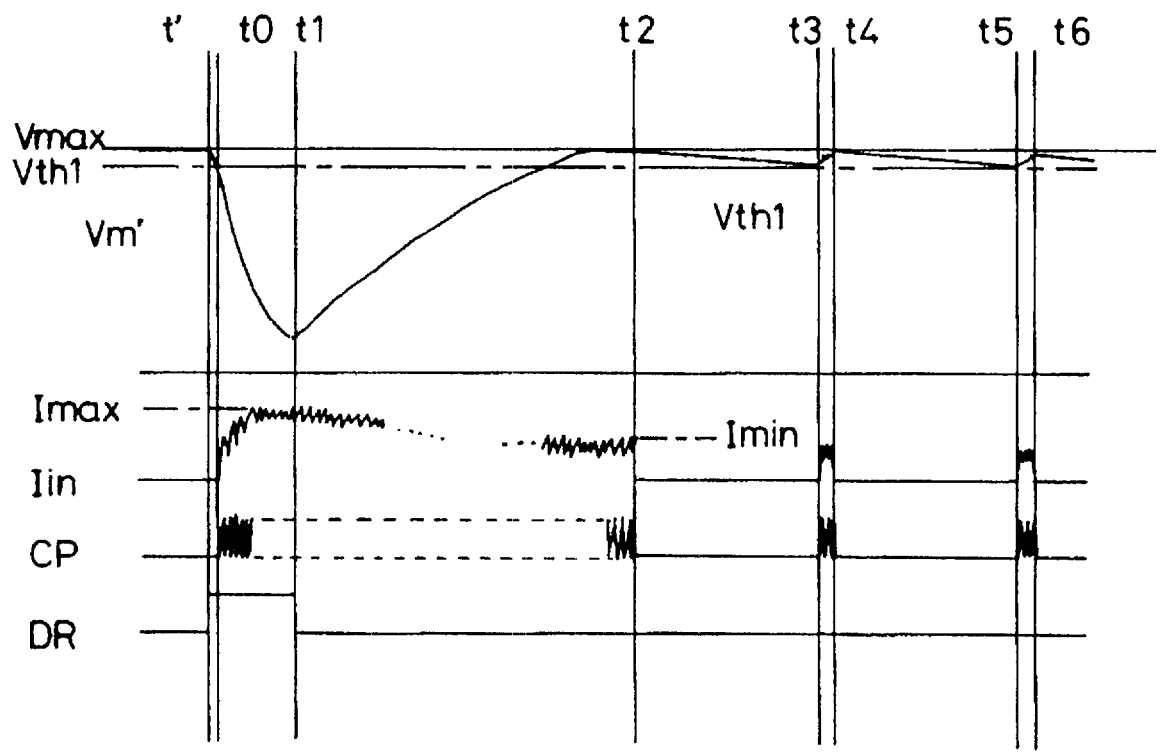
FIG. 3 is a timing chart for explaining operation of FIG. 1.

Next, an explanation will be given of an outline of the operation with reference to FIG. 3. Further, it is assumed that the reference booster signal cp0 is output from the CPU1, the booster permitting signal Sb is at an "H" level and the booster control signal Sa is at an "L" level.

When an exposure operation is executed in accordance with operation of the release switch (not illustrated) and the drive circuit DRV8 is operated with the capacitor C2 as power source and the motor 9 starts driving (refer to t'), the charge voltage Vm of the capacitor C2 is lowered and voltage Vm' which is the divided voltage of the charge voltage Vm is also lowered by that amount.

When the voltage Vm' becomes equal to or lower than the reference voltage Vth1 (refer to t0), the voltage detecting circuit VDT1 outputs an "H" level signal to the terminal DW, the gate circuit 11c is opened and the reference booster signal cp0 is output from the gate circuit 11c.

On this occasion, when the voltage Vr across the resistor R2 is smaller than the reference voltage Vth2, the output of the comparator CMP2 becomes "L" in level, the one-shot pulse generating circuit 10 does not generate a pulse and the output of the inverter 11a becomes "H" and accordingly, the reference booster signal cp0 is output from the output terminal cp of the gate circuit 11d. Therefore, the switching transistor TR1 is turned ON or OFF based on the reference booster signal cp0 and when the switching transistor TR1 is switched from ON to OFF, the capacitor C2 is charged by a counter electromotive force produced at the booster coil L1.

When the charging operation has progressed and the counter electromotive force of the booster coil L1 is increased, current Iin consumed from the battery E is increased and the voltage of the battery E is lowered.

Hence, in this example, with regard to a reduced voltage state of the battery E, the reduced voltage state of the battery E is detected by detecting current flowing in the converter 7, specifically, by detecting a voltage (the voltage of the resistor R2) the magnitude of which is changed in proportion to the current flowing in the converter, and when the detected voltage exceeds a predetermined value, the boosting operation of the converter 7 is restrained and the magnitude of current flowing out from the battery E is restrained.

Figure 4:
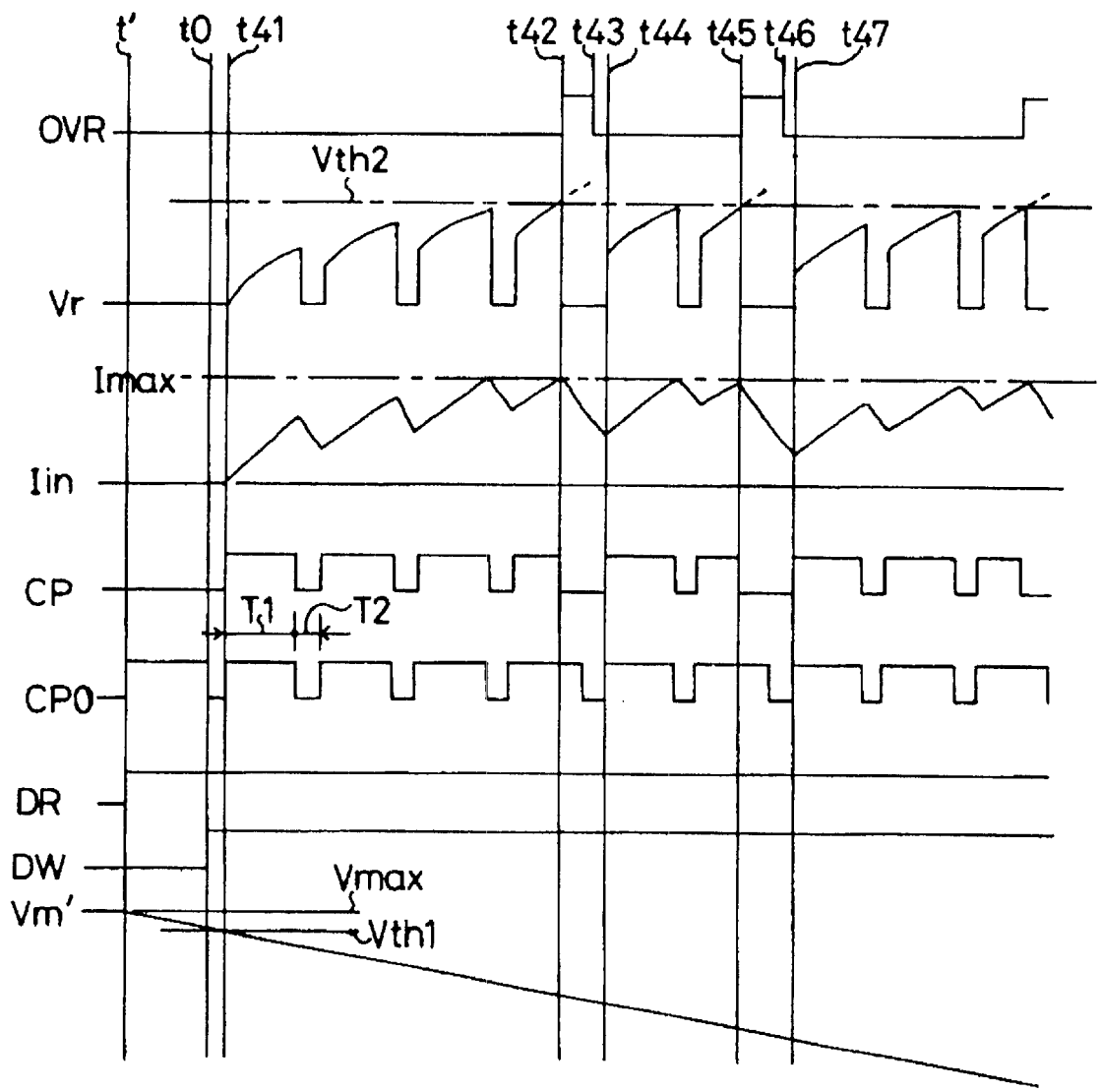
FIG. 4 is a timing chart for explaining operation of FIG. 1.

Next, a detailed description will be given of operation of the above-described circuit with reference to FIG. 4, which is a detailed timing diagram of a time period before reaching times t' through t1 of FIG. 3. In the drawing, times t' and t0 are the same as the times t' and to of FIG. 3, notations OVR, cp and DW show voltage waveforms of the terminal OVR, the terminal cp and the terminal DW of FIG. 1 and notations Vr, Iin, cp0, DR and Vm' respectively designate the voltage Vr, the current Iin, the reference booster signal cp0, the operation control signal DR and the voltage Vm' of FIG. 1.

As mentioned above, when the exposure operation is i executed in accordance with operation of the release switch (not illustrated) the drive circuit DRV8 is operated by the operation control signal DR with the capacitor C2 as a power source and the motor 9 starts driving (refer to t'), the charge voltage Vm of the capacitor C2 is lowered and the voltage Vm' which is the divided voltage of the charge voltage Vm is also lowered by that amount.

When the voltage Vm' becomes equal to or lower than the reference voltage Vth1 (refer to t0), the terminal DW becomes "H" in level and the reference booster signal cp0 is output from the gate circuit 11c (refer to t41).

On this occasion, when the applied voltage Vr of the resistor R2 is smaller than the reference voltage Vth2, the output of the comparator CMP2 becomes "L", the one-shot pulse generating circuit 10 does not generate a pulse, the output of the inverter 11a becomes "H" and accordingly, the reference booster signal cp0 is output from the output terminal cp of the gate circuit 11d. Therefore, the switching transistor TR1 is turned ON or OFF based on the reference booster signal cp0 and the capacitor C2 is charged by the counter electromotive force produced at the booster coil L1 when the switching transistor TR1 is switched from ON to OFF.

When the above-described charging operation has progressed and the counter electromotive force of the booster coil L1 is increased, the current Iin consumed from the battery E is increased and in accordance therewith, ON current flowing to the switching transistor TR1 when the switching transistor TR1 is turned ON is increased, and the applied voltage Vr of the resistor R2 is increased (refer to t41 through t42).

When the applied voltage Vr of the resistor R2 becomes equal to or larger than the reference voltage Vth2, the output of the comparator CMP2 becomes "H" in level and in accordance therewith, the one-shot pulse generating circuit 10 outputs the pulse OVR (refer to t42).

The pulse OVR is inverted by the inverter 11a, the gate circuit 11d is closed by the inverted signal and the "H" level of the reference booster signal cp0 output to the terminal cp is cut by the time period of the pulse OVR. By cutting the "H" level during the time period of the pulse OVR, the voltage of the booster coil L1 is lowered and in accordance therewith, the consumed current Iin from the battery E is lowered (refer to t42 through t44).

When the pulse OVR has terminated, the output of the inverter 11a returns to "H", the gate circuit 11d is opened and accordingly, similar to the above-described operation, the reference booster signal cp0 is output to the terminal cp and the booster operation is carried out similar to the above-described operation (refer to t44 through t45).

At subsequent times, the operation is carried out similar to that described above, at every time at which the voltage Vr exceeds the reference voltage Vth2, the pulse OVR is output and the boosting operation is prohibited during that time period.

In this way, the current flowing from the battery E to the converter 7 is detected based on a value in correspondence with the current value, and more specifically, a voltage value in proportion to the current value, and the operation of the converter 7 is controlled in accordance with the magnitude of the detected value. Accordingly, the magnitude of the current flowing out of the battery E can be controlled. Therefore, for example, a peak value of the current flowing out of the battery E can be restricted and a temporary voltage drop of the battery E can be restrained. Further, when individual pulse widths of pulses at an "H" level of the reference booster signal cp0 are controlled to reduce as in this example, a value of the current flowing out from the battery E can finely be controlled.

Further, the pulse width of the pulse OVR can pertinently be changed in accordance with the reference booster signal cp0.

Figure 5:
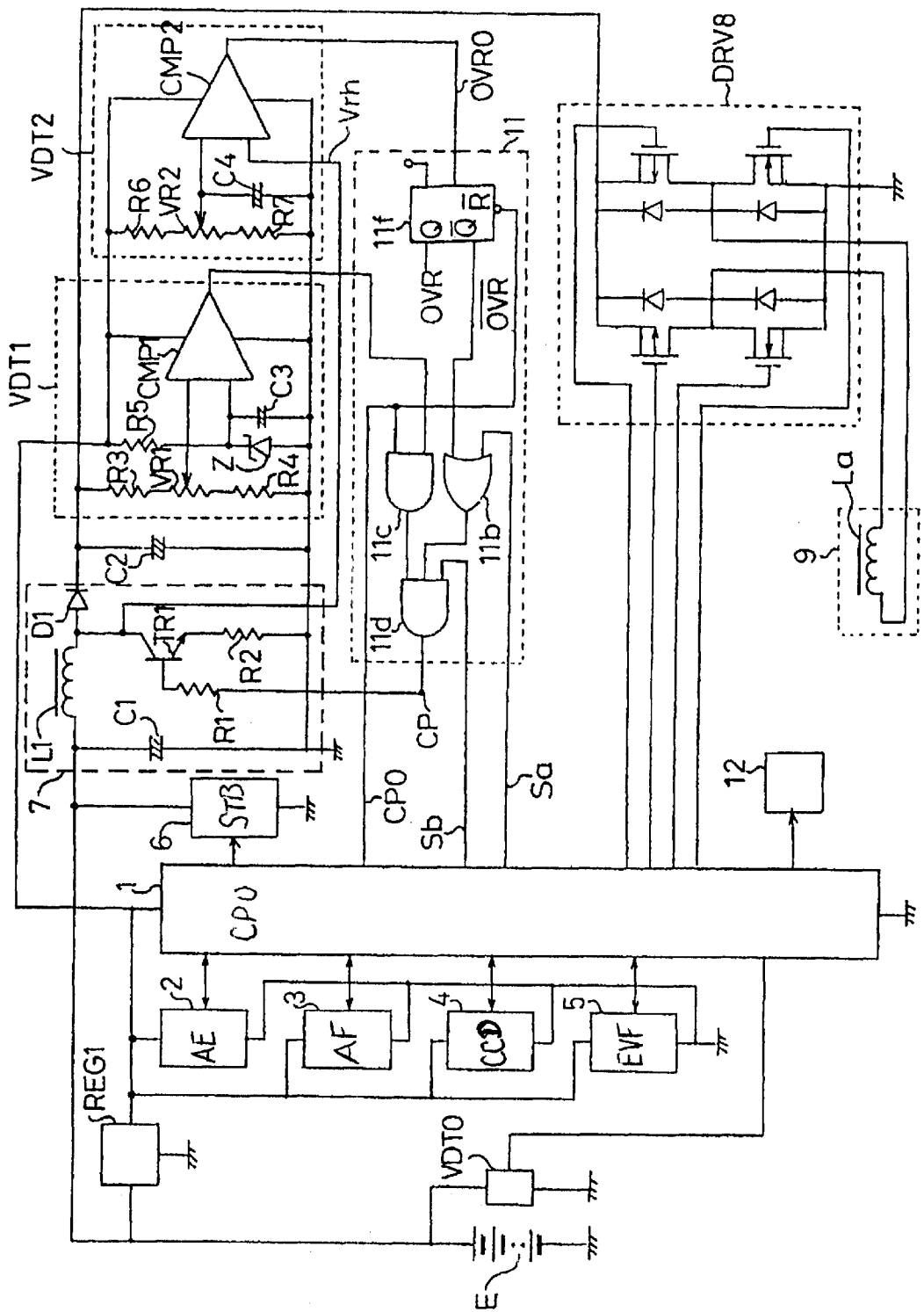
FIG. 5 is a circuit diagram showing another embodiment of the invention.

Next, an explanation will be given of another embodiment with reference to FIG. 5. In FIG. 5, notation 11f designates a flip-flop and elements which are the same or similar to those in FIG. 1 are designated with the same notations. Further, in this example, the reduced voltage state of the battery E is detected by detecting voltage Vrh applied to the resistor R2 and the switching transistor TR1, so that when the detected voltage exceeds a predetermined value during a time period in which the switching transistor TR1 is turned ON, the boosting operation of the converter 7 is restrained and the magnitude of the current flowing out of the battery E is restrained. Further, a reference voltage Vth3 compared by the comparator CMP2 is made higher than the reference voltage Vth2 shown in FIG. 1.

Figure 6:
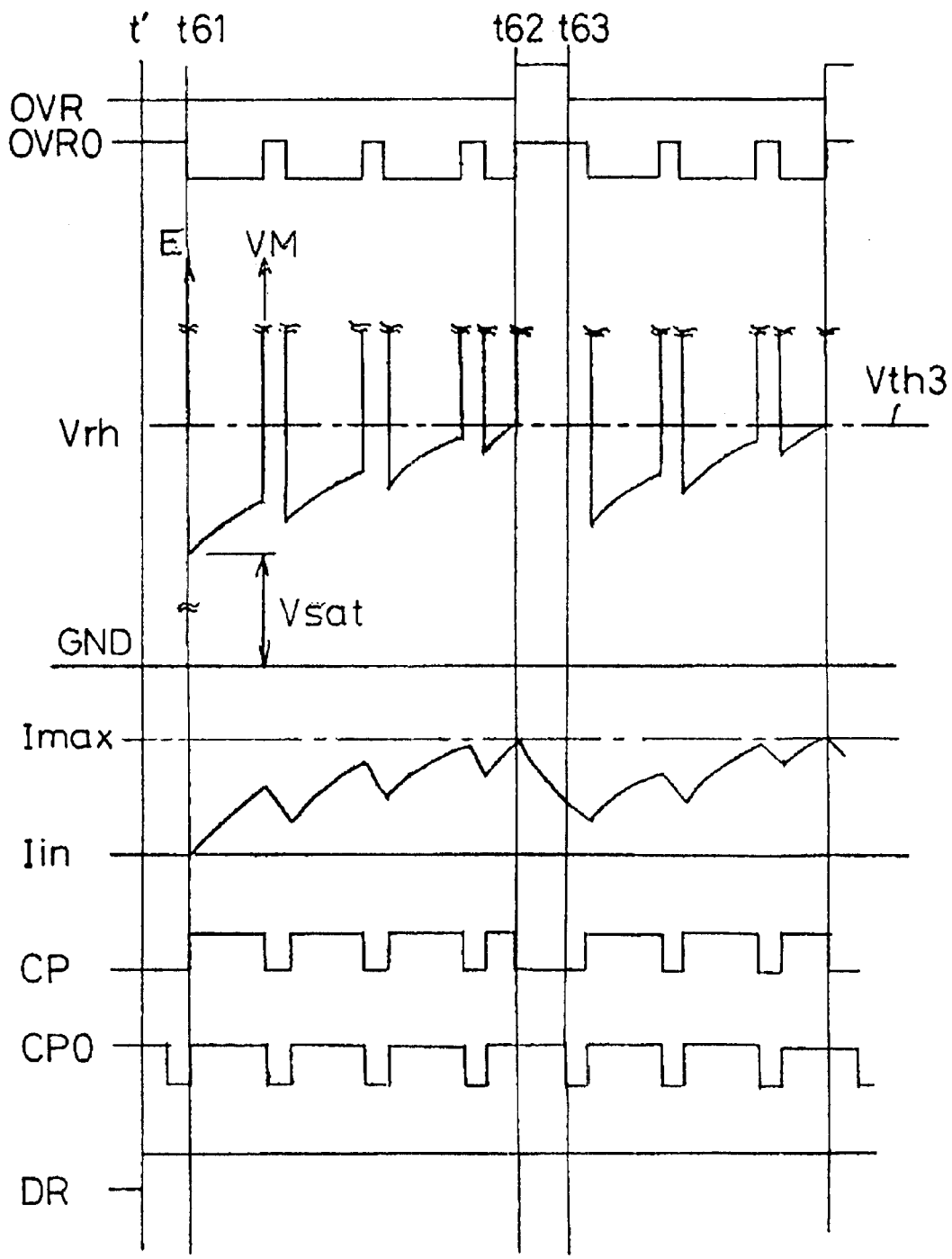
FIG. 6 is a timing chart for explaining operation of FIG. 5.

Next, an explanation will be given of the operation with reference to FIG. 6. In this example, an explanation will be given based on differences in operation from that of FIG. 1.

When the operation control signals DR become "H" and the motor 9 starts driving with the capacitor C2 as a power source (refer to t'), the charge voltage of the capacitor C2 is lowered, the gate circuit 11c is opened by an "H" level output of the voltage detecting circuit VDT1 and the reference booster signal cp0 is output from the terminal cp (refer to t61).

The voltage of the booster coil L1 is increased by the output of the reference booster signal cp0 and in accordance therewith, the voltage Vrh during the time period in which the switching transistor TR1 is turned ON (hereinafter, simply referred to as "voltage Vrh") is also increased (refer to t61 through t62). Further, the flip-flop 11f is reset by an "L" output of the reference booster signal cp0.

When the voltage Vrh becomes equal to or higher than the reference voltage Vth3, the voltage detecting circuit VDT2 makes the terminal OVR0 "H" in level and in accordance therewith, the Q terminal of the flip flop 11f becomes "L" in level, the gate circuit 11d is closed, the reference booster signal cp0 to the terminal cp stops being output (refer to t62) and the voltage Vrh is reduced (refer to t62 through t63).

The flip flop 11f is reset by "L" of the reference booster signal cp0 and operation similar to the above-described is repeated (refer to t63 and thereafter).

In this manner, the reduced voltage state of the battery E is detected by detecting the voltage Vrh applied to the resistor R2 and the switching transistor TR1, and when the detected voltage exceeds a predetermined value, the boosting operation of the converter 7 is restrained, the magnitude of the current consumed from the battery E is restrained and accordingly, there is achieved an effect similar to that in the example of FIG. 1, an inversion level of voltage compared and detected by the comparator CMP2 can be shifted upwardly from that in the case of FIG. 1 by the saturated voltage of the switch transistor TR1 and accordingly, there is no need for using a construction which can detect a very small voltage as the comparator CMP2 as in FIG. 1 and low cost implementation is achieved.

In accordance with the above-described embodiments, the reduced voltage state of the battery E is detected by detecting the voltage of the resistor R2 or the voltage of the resistor R2 and the switching transistor TR1. When the detected voltage exceeds a predetermined value, the boosting operation of the converter 7 is restrained and the magnitude of the current flowing out of the battery E is restrained.

Figure 7:
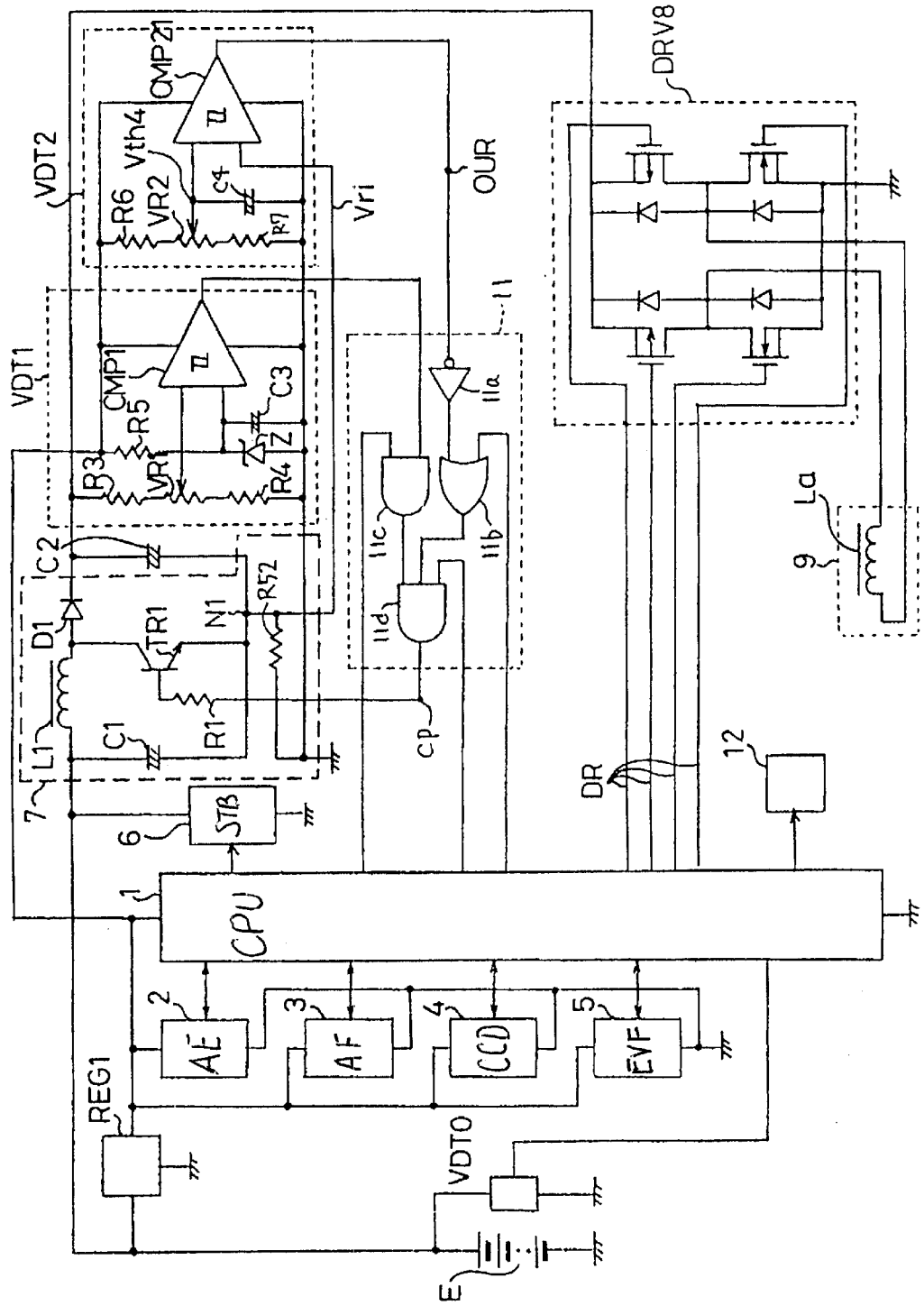
FIG. 7 is a circuit diagram showing still another embodiment of the invention.

With reference to FIG. 7, an embodiment will be described in which the emitter of the switching transistor TR1 is connected to low potential sides of the capacitors C1 and C2 and a voltage across a resistor R52 provided between a terminal N1 and a low potential side of the power source is detected to thereby detect the reduced voltage state of the battery E. When the detected voltage exceeds a predetermined value, the boosting operation of the converter 7 is restrained to thereby restrain the magnitude of the current consumed from the battery E.

In FIG. 7, elements which are the same or similar to those in FIG. 1 are designated by the same reference numerals. In FIG. 7, a comparator CMP21 in the voltage detecting circuit VDT2 is provided with hysteresis, compares voltage Vri generated at the terminal N1 with reference voltage Vth4 set by the resistors R6 and R7 and the variable resistor VR2, outputs an "H" level when the voltage Vri becomes equal to or higher than the reference voltage Vth4 and outputs an "L" level when the voltage Vri becomes equal to or lower than voltage Vth5 produced by subtracting the hysteresis voltage ΔVha from the reference voltage Vth4.

Figure 8:
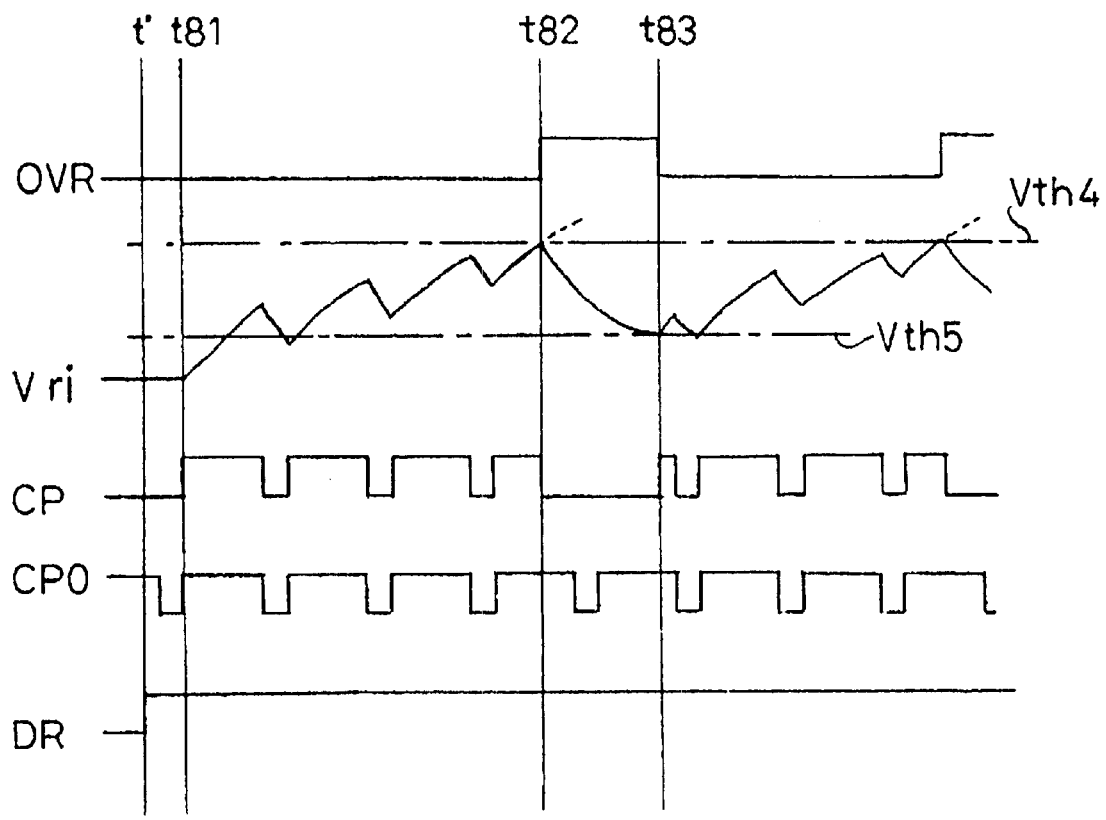
FIG. 8 is a timing chart for explaining operation of FIG. 7.

Next, an explanation will be given of operation of FIG. 7 with reference to FIG. 8. Further, in this example, an explanation will be given centering on differences in operation from that of FIG. 1.

When the operation control signals DR become "H" and the motor 9 starts driving with the capacitor C2 as a power source (refer to t'), the charge voltage of the capacitor C2 is lowered, the gate circuit 11c is opened by the output of the voltage detecting circuit VDT1 and the reference booster signal cp0 is output from the terminal cp (refer to t81).

The voltage of the booster coil L1 is increased by the output of the reference booster signal cp0 and in accordance therewith, the voltage Vri across terminals of the resistor R52 is also increased (refer to t81 through t82). When the voltage Vri becomes equal to or higher than the reference voltage Vth4, the voltage detecting circuit VDT2 makes the terminal OVR "H" in level and in accordance therewith, the gate circuit 11d is closed and the reference booster voltage cp0 to the terminal cp stops being output (refer to t82).

At this time, an amount of current change in accordance with the turning OFF of the switching transistor TR1, that is, an alternating current component flows to the terminal N1 via the capacitors C2 and C1 and accordingly, the voltage Vri is reduced comparatively gradually (refer to t82 through t83).

When the voltage Vri becomes equal to or lower than the voltage Vth5 produced by subtracting the hysteresis voltage ΔVha from the reference voltage vth4, the voltage detecting circuit VDT2 makes the terminal OVR "L" in level and starts the above-described charging operation again. Thereafter, the above-described operation is repeated.

In this way, the emitter of the switching transistor TR1 is connected with the low potential side of the capacitor C2 and the voltage of the resistor R52 provided between the terminal N1 and the low potential side of the power source is detected to thereby detect the reduced voltage state of the battery E. When the detected voltage exceeds the predetermined value, the boosting operation of the converter 7 is restrained, the magnitude of the current consumed from the battery E is restrained and therefore, the magnitude of the current flowing out from the battery E can be controlled. Therefore, for example, the peak value of the current flowing out from the battery E can be restricted and the temporary voltage drop of the battery E can be restrained. Further, when the individual pulse width of the pulse at an "H" level of the reference booster signal cp0 is controlled to reduce as necessary as in this example, the amount of the current flowing out of the battery E can be finely controlled. Further, even when the switching transistor TR1 is turned OFF, the voltage of the terminal N1 is gradually reduced and accordingly, when the voltage reducing time period is made to specify the time period of prohibiting the pulse at the "H" level of the reference booster signal cp0, there is no need for providing the one-shot pulse generating circuit as in the case of FIG. 1 and simplification of the circuit construction is achieved.

According to the respective examples of FIGS. 1, 5 and 7, depending on the manner of use, there is a possibility in which the charge voltage of the capacitor C2 becomes lower than the voltage of the battery E and in this case, current flows automatically from the battery to the capacitor C2 and accordingly, there is a case in which it is difficult to restrain the peak value of the current flowing out of the battery E in driving the actuator (motor). In such a case, a converter shown in FIG. 9 may be used in place of the converter 7 in FIGS. 1 and 5 and a converter shown in FIG. 10 may be used in place of the converter 7 of FIG. 7. Further, in FIGS. 7 and 8, elements which are the same or similar to as those in FIGS. 1 and 5 are denoted by the same reference numerals and voltages generated at the terminal E, the terminal cp, the terminal Vm, the terminal Vr and the terminal Vri respectively correspond to voltages E, cp, Vm, Vr and Vri respectively generated in FIGS. 1, 5 and 7. An explanation will be given of FIGS. 9 and 10 as follows.

Figure 9:
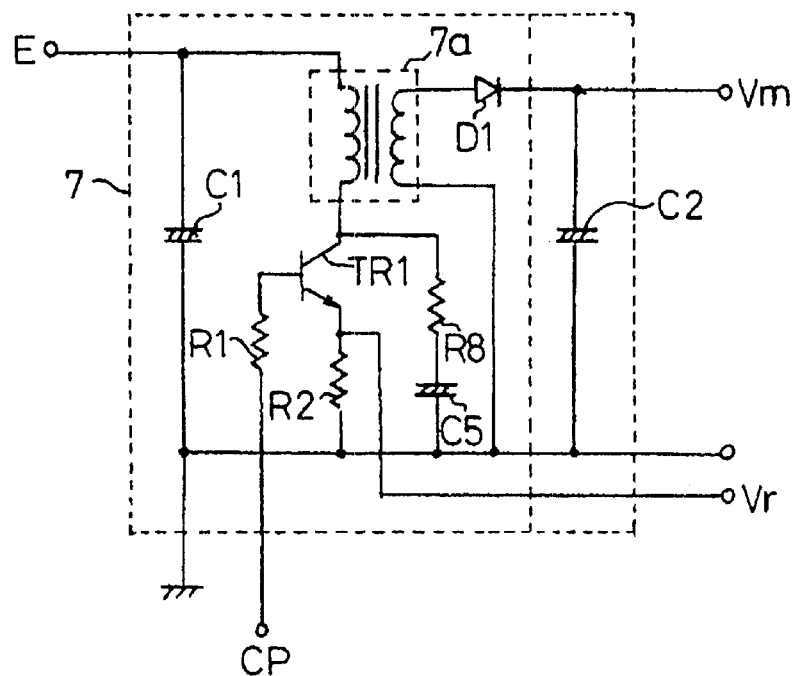
FIG. 9 is a circuit diagram showing essential portions of still another embodiment of the invention.

In FIG. 9, reference numeral 7a designates a transformer, reference numeral R8 designates a resistor and reference numeral C5 designates a capacitor. In this case, even when the charge voltage of the capacitor C2 becomes lower than the voltage of the battery E, the battery E and the capacitor C2 are separated by the transformer 7a and accordingly, current does not flow from the battery E to the capacitor C2 and the above-described problem is not posed.

Figure 10:
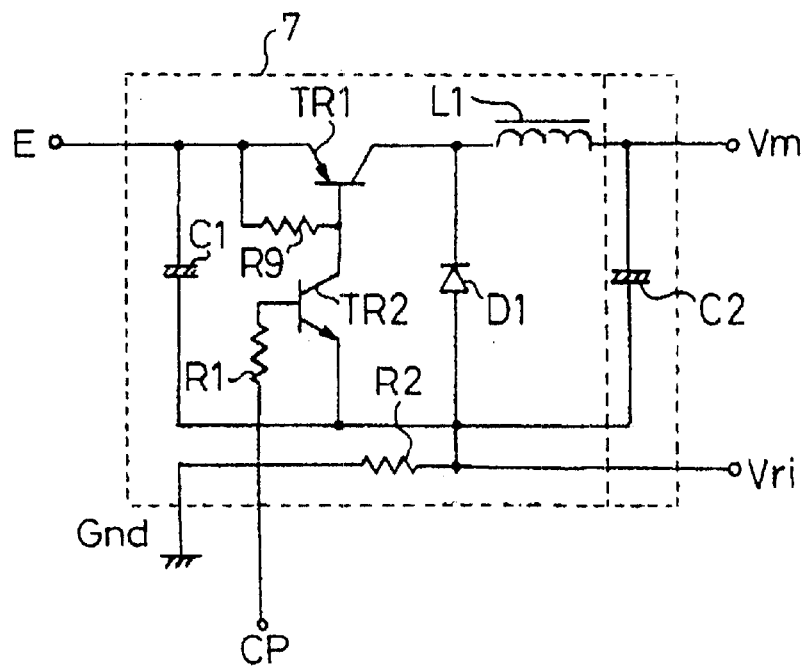
FIG. 10 is a circuit diagram showing essential portions of still another embodiment of the invention.

In FIG. 10, notation TR1 designates a transistor for switching and notation R9 designates a resistor and in this case, the battery E and the capacitor C2 are separated by the switching transistor TR1 and accordingly, even when the charge voltage of the capacitor C2 becomes lower than the voltage of the battery E, current does not flow from the battery E to the capacitor C2 and the above-described problem is not posed.

Figure 11:
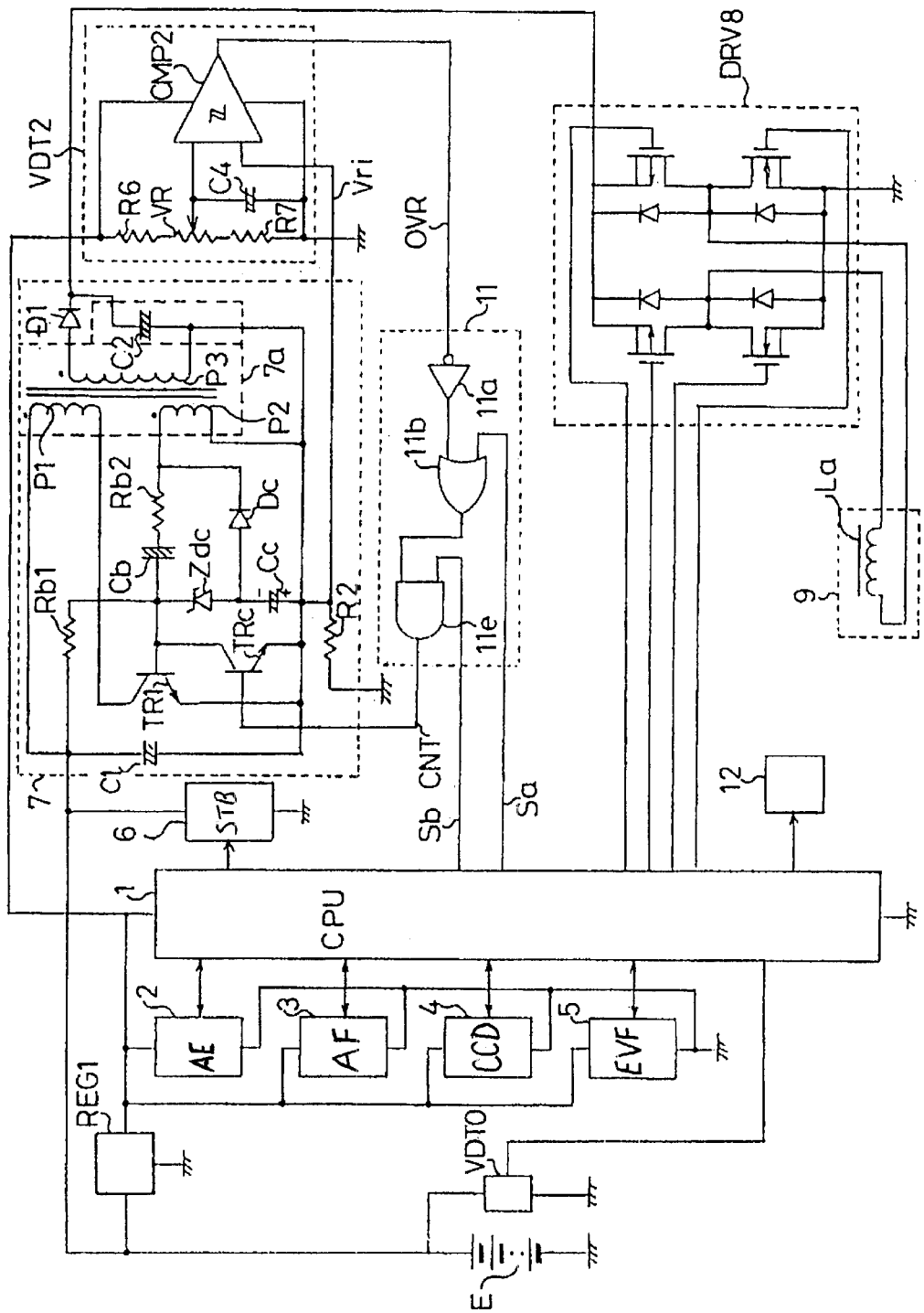
FIG. 11 is a circuit diagram showing essential portions of still another embodiment of the invention.

Although according to the above-described respective examples, the reference booster signal cp0 is output from the CPU 1, an explanation will be given of an example in which the converter per se is provided with an oscillating function and the reference booster signal cp0 need not be supplied from the CPU 1 in reference to FIG. 11 as follows. In this example, there is used a publicly-known ringing choke converter as the converter 7. Output voltage is stabilized by a Zener diode Zdc, a diode Dc and a capacitor Cc, and start and stop of oscillation is controlled by making a transistor Trc turn ON or OFF by a signal input via a terminal CNT. Further, in the drawing, elements which are the same or similar to those in FIG. 1 are designated with the same reference numerals, reference numeral 7a designates a transformer having windings P1 (primary winding), P2 (base winding) and P3 (secondary winding), notations Rb1 and Rb2 designate resistors and notation Cb designates a capacitor.

Also in this case, the battery E and the capacitor C2 are separated from each other by the transformer 7a and accordingly, even when the charge voltage of the capacitor C2 becomes lower than the voltage of the battery E, current does not flow from the battery E to the capacitor C2 and the above-described problem is not posed.

As in the above-described respective examples, the charge voltage of the capacitor C2 can be used in driving the motor for driving the shutter A which serves also as a diaphragm (exposure control member) and accordingly, the current flowing from the battery E can be reduced and the time during which the battery voltage is temporarily lowered by driving the motor 9 can be reduced. Therefore, in the case in which the above-described circuit construction is used in a camera having a function of determining battery rundown when, for example, the battery voltage becomes smaller than a predetermined value, driving the motor 9 for driving the shutter A which serves also as a diaphragm (exposure control member), does not cause the problem of voltage drop in the battery so that a battery in which only a small time period has elapsed from the start of use is deemed to have undergone "battery rundown". This effect becomes particularly significant when the above-described circuit is used in a digital still camera in which CCDs or an electronic viewfinder is operated in driving the motor for driving the exposure control member. That is, according to such a digital still camera, driving of the motor for driving the exposure control member is executed simultaneously with operation of the CCDs or the electronic viewfinder and in driving the motor, the battery voltage is temporarily and rapidly lowered, however, when the above-described circuit is used, the rapid lowering of the battery voltage can be reduced. Therefore, the problem in which a relatively new battery is deemed to have been rundown is overcome.

Figure 12:
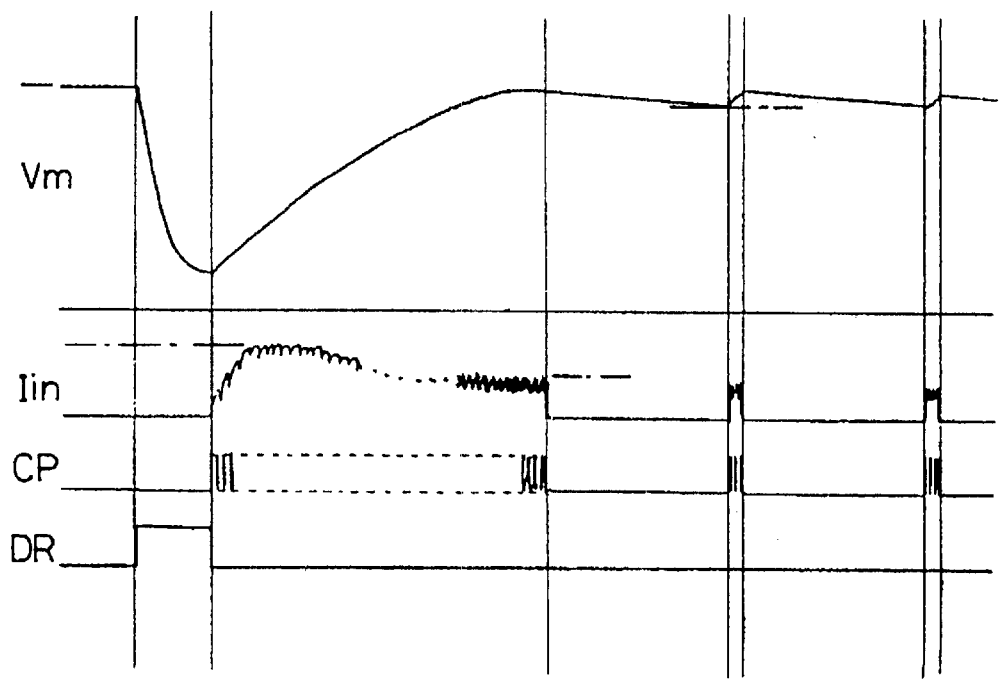
FIG. 12 is a timing chart for explaining operation of the still another embodiment of the invention.
Figure 13:
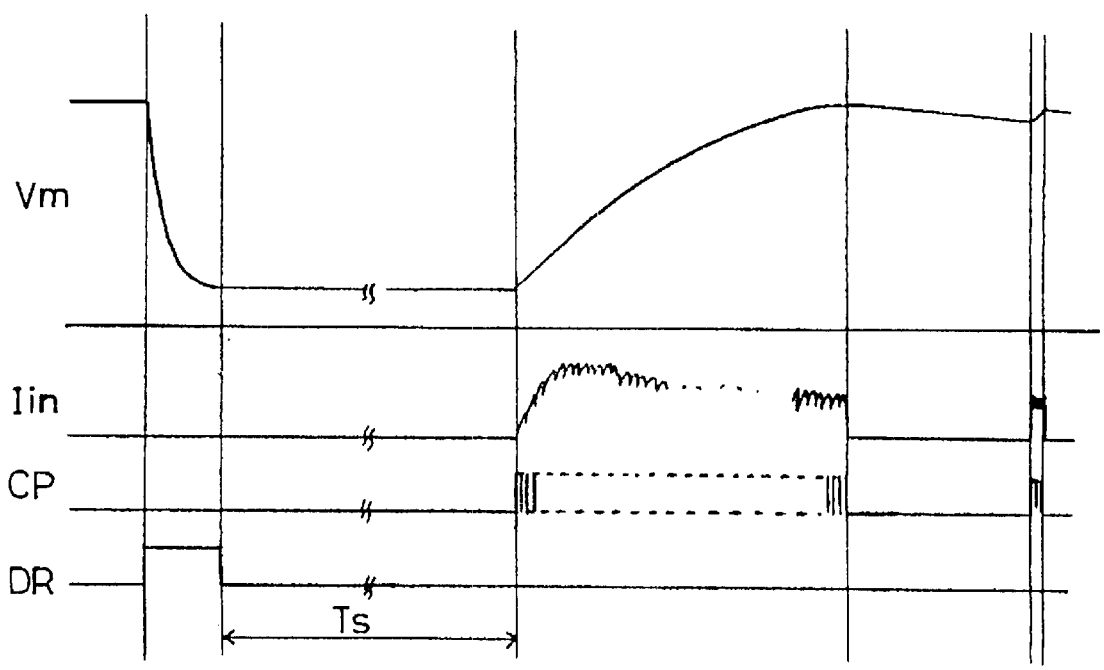
FIG. 13 is a timing chart for explaining operation of the still another embodiment of the invention.

Further, although according to the above-described respective examples, the converter 7 is driven in driving the motor 9, the operation of the converter 7 may be stopped in driving the motor 9 as shown in FIG. 12 by selectively outputting the booster control signal Sa and the booster permitting signal Sb from the CPU 1, or the converter 7 may be prevented from being operated in driving the motor 9 and during predetermined time period thereafter as shown by FIG. 13. Further, in the case of operating the converter 7 as shown by FIG. 12 in driving the motor 9, the booster permitting signal Sb may be made "L" or an output of the reference booster signal cp0 may be stopped and in the case of operating the converter 7 as shown in FIG. 13, in driving the motor 9 and during a predetermined time period thereafter, the booster permitting signal Sb may be made "L" in level or output of the reference booster signal cp0 may be stopped.

Further, although an explanation has been given of the shutter which also serves as a diaphragm having two positions of open and close in the above-described examples, the invention is not limited thereto but is applicable to a diaphragm or a shutter having a plurality of positions.

Further, the actuator is not limited to the motor of a single coil type but a stepping motor for driving a plurality of coils or other kinds of actuator, for example, a plunger may be used.

Further, the exposure control member is not limited to the above-described configuration. For example, there may be used a member of changing a diaphragm aperture or a member switching to insert or not to insert a member having a different transmitted light amount as in an ND filter.

According to the present invention, electric charge for charging the capacitor can be supplied as current for operating the actuator for driving the exposure control member in photographing a picture in which current is mostly needed and accordingly, current flowing out from the battery can be reduced in photographing a picture.

Further, by controlling the magnitude of the current flowing from the battery, the peak value of the current flowing from the battery can be restricted and temporary and rapid voltage drop of the battery can be restrained.

When the operation of the booster circuit is controlled such that the detected value does not exceed a predetermined value, for example, restriction of the peak value of the current flowing from the battery and restraint of temporary voltage drop of the battery can effectively be controlled.

Further, when the pulse width of the switching pulse for specifying the switching operation of the switching transistor is controlled in accordance with the magnitude of the detected value, the individual pulse width can be switched and accordingly, the value of the current flowing out from the battery can finely be controlled.

When the booster circuit includes the resistor in which ON current of the switching transistor flows and the detecting circuit detects the sum of the voltage generated by flowing the ON current in the resistor and the saturated voltage of the switching transistor generated when the switching transistor flows the ON current, the saturated voltage can be used as a bias voltage and therefore, the detection level can be shifted.

There may be constructed a circuit in which the booster circuit includes the booster coil and the switching transistor, the booster voltage is output by the switching operation of the switching transistor, the collector of the switching transistor is connected to one end of the capacitor via the diode, the emitter of the switching transistor is connected to other end of the capacitor and the voltage generated at the resistor provided between the emitter of the switching transistor and low potential side of the battery is detected. In this case, the detected voltage is increased or reduced retardedly from ON or OFF of the switching transistor by influence of the capacitor and is easy to detect.

We claim:

1. An exposure control drive apparatus comprising: a boosting circuit for boosting a voltage of a battery and outputting a boosted voltage; a capacitor charged by the boosted voltage; an actuator for driving an exposure control mechanism and having the capacitor as a power source; a detecting circuit for detecting a current flowing in the boosting circuit while the boosting circuit is boosting the voltage of the battery; and a control circuit for controlling operation of the boosting circuit in accordance with a magnitude of the detected current; wherein the boosting circuit has a transistor and a resistor through which an ON current of the transistor flows, the boosting circuit outputs the boosted voltage by a switching operation of the transistor, the resistor is connected to the transistor so that a voltage across the resistor is proportional to a magnitude of the ON current of the transistor, the magnitude of the ON current of the transistor corresponds to a current flowing from the battery, and the detecting circuit detects a voltage generated across the resistor in response to the ON current.

2. An exposure control drive apparatus according to claim 1; wherein the control circuit prevents the boosting circuit from boosting the battery voltage when the detected current exceeds a predetermined level and permits the boosting circuit to boost the battery voltage when the detected current is below the predetermined level, to thereby prevent a current flowing from the battery from exceeding a maximum level.

3. An exposure control drive apparatus according to claim 1; wherein the control circuit controls operation of the boosting circuit such that the detected current flowing in the boosting circuit does not exceed a predetermined level.

4. An exposure control drive apparatus according to claim 1; wherein the control circuit controls a pulse width of a switching pulse applied to the transistor for controlling a timing of the switching operation of the transistor in accordance with the magnitude of the detected current.

5. An exposure control drive apparatus according to claim 4; wherein a duty cycle of the switching pulse is equal to or larger than 50%.

6. An exposure control drive apparatus according to claim 4; wherein the detecting circuit detects a sum of voltages generated across the resistor in response to the ON current and a saturated voltage of the transistor generated when the transistor flows the ON current.

7. An exposure control drive apparatus according to claim 1; wherein the boosting circuit further includes a coil, a collector of the transistor is connected to one end of the capacitor via a diode, an emitter of the transistor is connected to an opposite end of the capacitor; and the resistor is connected between the emitter of the transistor and a low potential side of the battery.

8. An exposure control drive apparatus according to claim 1; wherein the boosting circuit is prohibited from executing a boosting operation while driving the actuator.

9. An exposure control drive apparatus according to claim 1; wherein the exposure control mechanism comprises a shutter.

10. An exposure control drive apparatus according to claim 9; wherein the shutter comprises means defining a shutter opening and sectors for opening and closing the shutter opening by reciprocal pivotal movement, and the actuator comprises a motor for reciprocally and pivotally moving the sectors by forwardly and reversely rotating a rotor of the motor by the application of forward and reverse current to a coil of the motor.

11. An exposure control drive apparatus according to claim 1; wherein the boosting circuit further comprises a coil for outputting an electromotive force in accordance with the ON/OFF state of the transistor to the capacitor to charge the capacitor.

12. An exposure control drive apparatus according to claim 11; wherein the detecting circuit comprises a first voltage detecting circuit comprising a voltage dividing circuit for dividing a voltage of the capacitor and producing a divided voltage and a comparator having a hysteresis characteristic for comparing the divided voltage with a first reference voltage and outputting a corresponding signal, a second voltage detecting circuit comprising a voltage dividing circuit for producing a second reference voltage and a comparator for comparing a voltage of the resistor of the booster circuit with the second reference voltage and outputting a corresponding signal, and a logic circuit for controlling the ON/OFF state of the transistor of the boosting circuit in accordance with an output of the second voltage detecting circuit so as to control the current in the boosting circuit.

13. An electronic camera having an exposure mechanism, an exposure control device, a CPU, a light measuring circuit, a distance measuring circuit, a photographing unit including CCDs as photographing elements, a CCD drive circuit, an image signal processing circuit, an electronic viewfinder including a display panel for displaying a photograph captured by the photographic unit, a display panel drive circuit, a stroboscopic light emitting unit, and an exposure control device; wherein the exposure control device comprises the exposure control drive apparatus according to claim 1.

14. An exposure control drive apparatus comprising: a boosting circuit for boosting a voltage of a battery and outputting a boosted voltage; a capacitor charged by the boosted voltage; an actuator for driving an exposure control mechanism and having the capacitor as a power source; a detecting circuit for detecting a current flowing in the boosting circuit while the boosting circuit is boosting the voltage of the battery; and a control circuit for controlling operation of the boosting circuit in accordance with a magnitude of the detected value, so that the boosting circuit is prevented from boosting the battery voltage when the detected current exceeds a predetermined level and permitted to boost the battery voltage when the detected current is below the predetermined level, to thereby prevent the current flowing from the battery from exceeding a maximum level; wherein the boosting circuit has a transistor and a resistor through which an ON current of the transistor flows, the boosting circuit outputs the boosted voltage by a switching operation of the transistor, the resistor is connected to the transistor so that a voltage across the resistor is proportional to a magnitude of the ON current of the transistor, the magnitude of the ON current of the transistor corresponds to a current flowing from the battery, and the detecting circuit detects a voltage,generated across the resistor in response to the ON current.

15. An exposure control drive apparatus for a comprising: a boosting circuit for boosting a voltage of a battery; a detecting circuit for detecting a voltage in the boosting circuit while the boosting circuit is boosting the voltage of the battery; and a control circuit for shutting off the boosting circuit when the detected voltage or current exceeds a predetermined value; wherein the boosting circuit has a transistor and a resistor through which an ON current of the transistor flows, the boosting circuit outputs the boosted voltage by a switching operation of the transistor, the resistor is connected to the transistor so that a voltage across the resistor is proportional to a magnitude of the ON current of the transistor, the magnitude of the ON current of the transistor corresponds to a current flowing from the battery, and the detecting circuit detects a voltage generated across the resistor in response to the ON current.

* * * * *